US007308177B1

(12) United States Patent
Raszka et al.

(10) Patent No.: US 7,308,177 B1
(45) Date of Patent: Dec. 11, 2007

(54) PARTIALLY FLEXIBLE WOUND OPTICAL FIBER BUNDLE HAVING INTERMEDIATE RIGID REGIONS AND METHODS OF FABRICATING THE SAME

(75) Inventors: Scott A. Raszka, Woodstock, CT (US); Gerald P. Senecal, Palmer, MA (US)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 11/490,870

(22) Filed: Jul. 22, 2006

Related U.S. Application Data

(60) Provisional application No. 60/701,557, filed on Jul. 23, 2005.

(51) Int. Cl.
*G02B 6/06* (2006.01)
*G02B 6/04* (2006.01)

(52) U.S. Cl. ...................................... 385/116; 385/115

(58) Field of Classification Search ......... 385/115-116
See application file for complete search history.

(56) References Cited

U.S. PATENT DOCUMENTS 3,033,731 A * 5/1962 Cole .......................... 156/175
3,580,775 A * 5/1971 Seigmund .................. 156/247
3,772,119 A * 11/1973 Peck .......................... 156/173
3,933,556 A * 1/1976 Strack ........................ 156/155
4,080,045 A * 3/1978 Nakatsubo et al. ......... 385/115
4,547,040 A * 10/1985 Yamamoto et al. ......... 385/143
7,149,393 B2 * 12/2006 Kerr et al. .................. 385/120

* cited by examiner

*Primary Examiner*—Michelle Connelly-Cushwa
*Assistant Examiner*—Kajli Prince
(74) *Attorney, Agent, or Firm*—Louis J. Franco; Law Office of Louis J. Franco

(57) ABSTRACT

A of fabricating a partially flexible optical fiber bundle includes forming plural helical fiber ribbons, each helical ribbon being formed by winding a fiber about a mandrel and adjacently fusing a first selected set of fiber portions within each ribbon to define and ends region. The ends regions of multiple fiber helixes are stacked and bonded to form a fiber bundle with and ends section. The ends section is cut through to yield opposed input and output ends of the fiber bundle. Intermediate rigid sections are formed along the length of the bundle by various alternative methods of adjacently bonding selected portions of the constituent ribbon and bundle fibers.

20 Claims, 12 Drawing Sheets

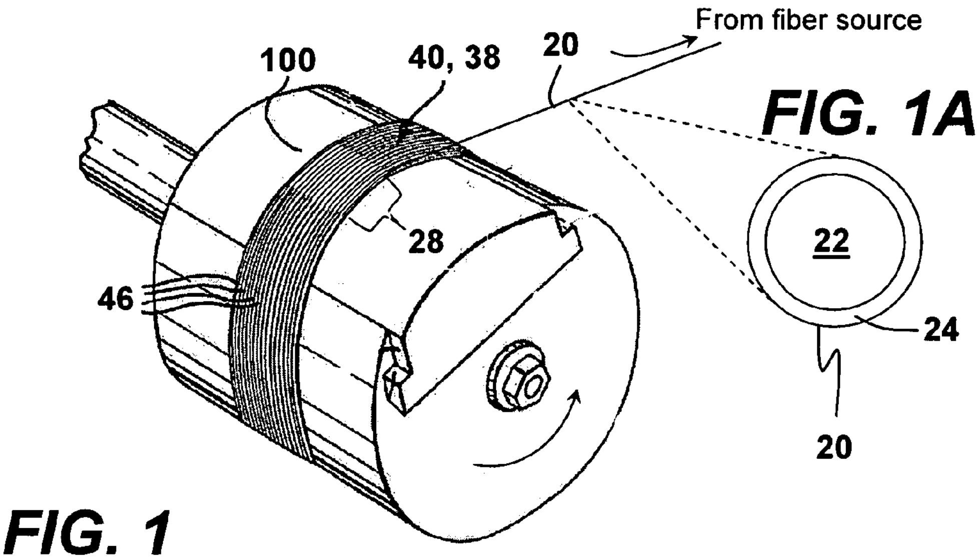
FIG. 1A
FIG. 1
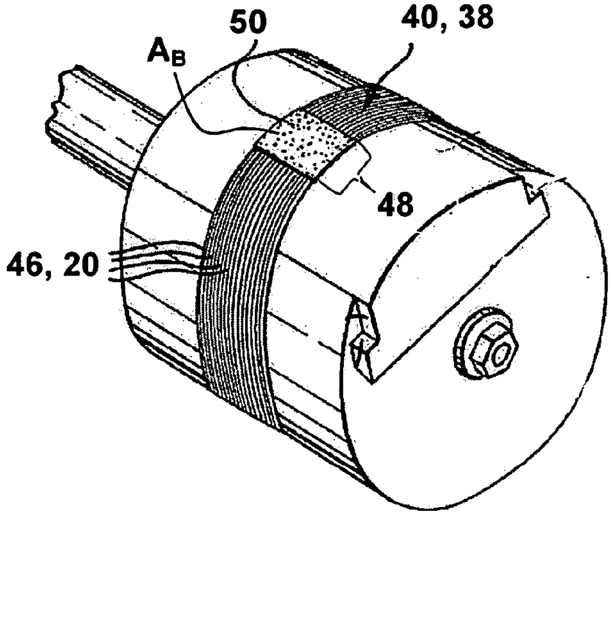
FIG. 2

Image Bundle side view showing multiple fiber ribbons 40 and rigid input and output ends 72a and 72b A fiber ribbon 40 like that of FIG. 10 is removed from the mandrel Image bundle side view showing multiple fiber ribbons 40, such as that of FIG. 11, rigid input and output ends 72a and 72b and rigid intermediate sections 76

Intermediate regions 60 formed on fiber ribbon 40 of FIG. 12 after removal of fiber ribbon 40 from mandrel (not shown in either FIG.)

Image bundle side view showing multiple fiber ribbons 40 with no intermediate regions 60, rigid input and output ends 72a and 72b

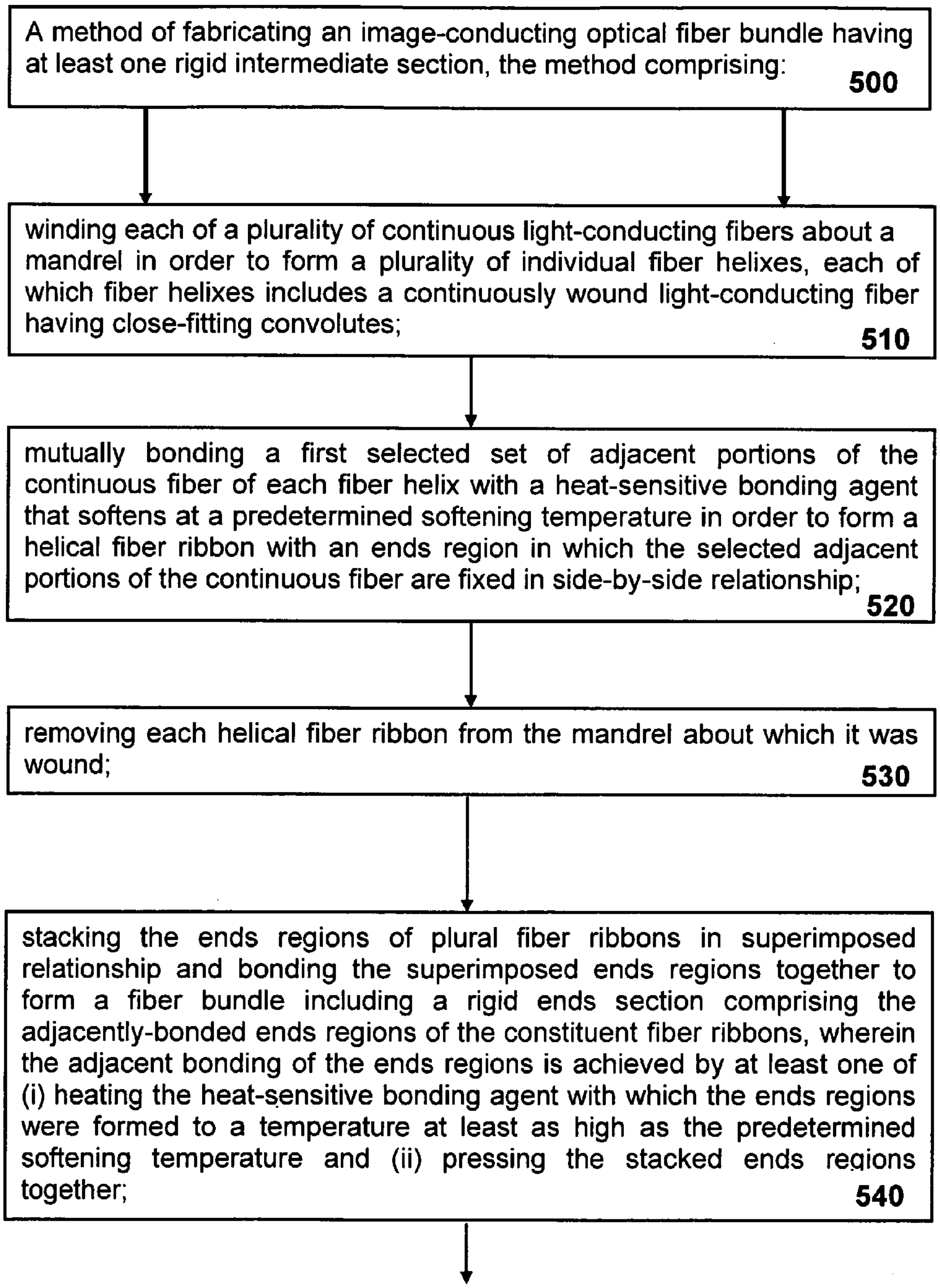
*FIG. 15* *sheet 1 of 2*

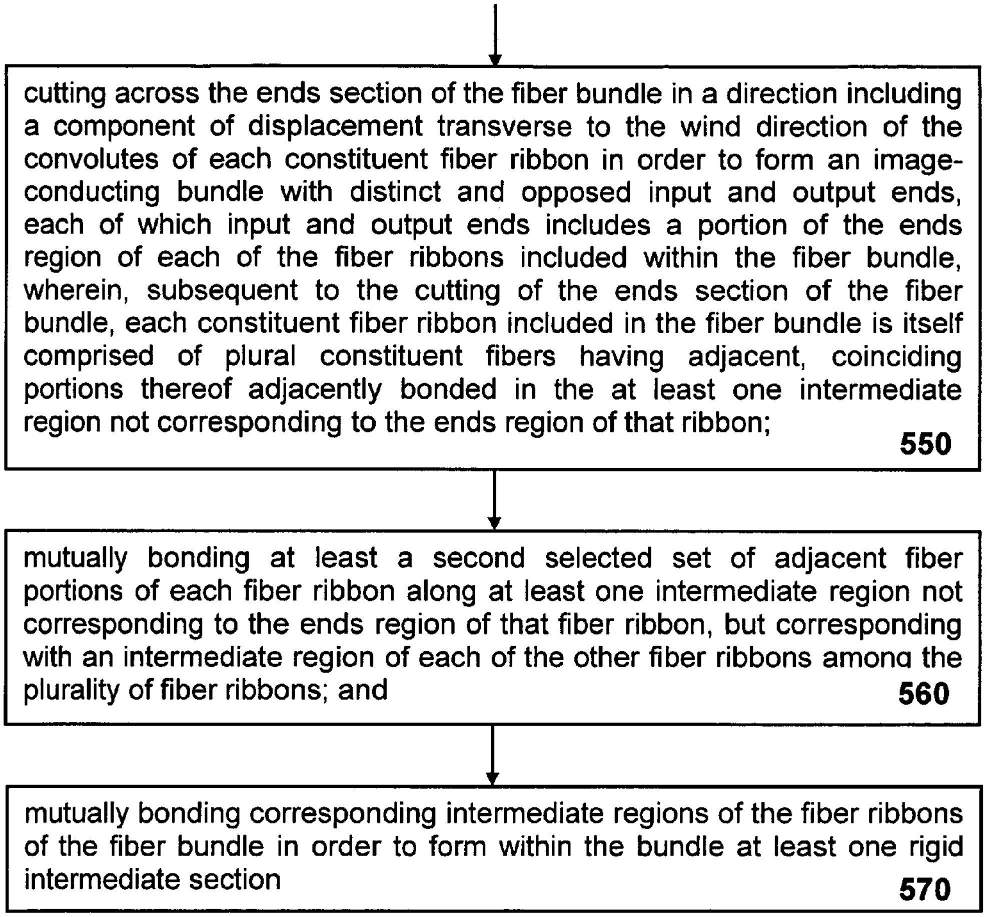

*FIG. 15 sheet 2 of 2* cutting across the ends section of the fiber bundle in a direction including a component of displacement transverse to the wind direction of the convolutes of each constituent fiber ribbon in order to form an image-conducting bundle with distinct and opposed input and output ends, each of which input and output ends includes a portion of the ends region of each of the fiber ribbons included within the fiber bundle, wherein, subsequent to the cutting of the ends section of the fiber bundle, each constituent fiber ribbon included in the fiber bundle is itself comprised of plural constituent fibers having adjacent, coinciding portions thereof adjacently bonded in the at least one intermediate region not corresponding to the ends region of that ribbon;
550 mutually bonding at least a second selected set of adjacent fiber portions of each fiber ribbon along at least one intermediate region not corresponding to the ends region of that fiber ribbon, but corresponding with an intermediate region of each of the other fiber ribbons among the plurality of fiber ribbons; and
560 mutually bonding corresponding intermediate regions of the fiber ribbons of the fiber bundle in order to form within the bundle at least one rigid intermediate section
570

PARTIALLY FLEXIBLE WOUND OPTICAL FIBER BUNDLE HAVING INTERMEDIATE RIGID REGIONS AND METHODS OF FABRICATING THE SAME

PROVISIONAL PRIORITY CLAIM

Priority based on Provisional Application Ser. No. 60/701,557, filed Saturday, Jul. 23, 2005, and entitled "PARTIALLY FLEXIBLE WOUND OPTICAL FIBER BUNDLE HAVING INTERMEDIATE RIGID REGIONS AND METHODS OF FABRICATING THE SAME," is claimed.

BACKGROUND

1. Field

Although not so limited in its utility or scope, implementations of the present invention relate generally to the fabrication of optical image transfer bundles (also known as "image-conducting bundles") of the type comprising a multitude of elongated light-conducting fibers extending between light-collecting and light-emitting ends and, more specifically, to image-transfer bundles having, between the light-collecting and light-emitting ends, flexible and rigid regions.

2. Brief Description of Illustrative Environments and Related Art

Known to practitioners of the optical fiber arts is that, in an image-conducting optical fiber bundle (hereinafter also "image-conducting bundle" or, simply, "image bundle"), wherein a multitude of relatively long and thin fibers of light-conducting material is bundled together and used to transmit image-forming light from one location to another, it is important that each fiber of the image bundle be orderly and accurately positioned therein with at least the opposed input and output ends of the image bundle substantially geometrically identical in character. In certain types of fiberscopes or other such devices that comprise a relatively thin but long bundle of light conducting fibers, it is often desirable to fasten only the opposite ends of the individual fibers in fixed relation with each other and to allow the intermediate portions of the fibers to be free to flex individually. An image bundle constructed in this manner is flexible throughout a region between its input and output ends and is useful under circumstances in which image-forming light must be directed from one location to another along irregularly shaped paths as, for instance, in an endoscope.

In order to form an image bundle that is capable of accurately transferring an optical image from one location to another, the opposed entrance and exit ends of the individual light-conducting fibers must be grouped in accurately aligned parallel side-by-side nested relation with each other and identically geometrically patterned to cause each part of the light (e.g., "pixel") of an optical image admitted in one location at the entrance end of each fiber of the group, to be emitted from the exit end of said group in a corresponding location so as to output an image similar to the input image. When the fabrication of flexible image bundles exhibiting acceptable image integrity and resolution was a nascent art, the accurate assembly of the input and output ends of image bundles was difficult, time consuming and costly. In the intervening decades, however, methods of manufacturing flexible image bundles have been simplified and, thus, rendered more accurate, less time-consuming and less expensive.

In accordance with one industry-wide method of fabricating a flexible image bundle, a continuous light-conducting fiber is helically wound onto a mandrel in order to form adjacent convolutions (i.e., windings) about the mandrel. Once a helix of predetermined width is formed, a predetermined "ends region" of the successive convolutions is laterally bonded such that the portions of the continuous fiber within that predetermined ends region are fixed in side-by-side relationship with each other prior to the removal of the helix from the mandrel. The bonding is conventionally achieved by application of a suitable glue, cement or epoxy. Once the bonding agent cures, the helix is removed from the mandrel.

In order to form two-dimensional input and output ends, a plurality of similarly fabricated helixes is assembled with the ends regions of multiple helixes stacked in aligned superimposed relationship and these ends regions are then secured in fixed relationship by a clamp, housing or a bonding agent such as cement, glue or epoxy. The assembly of ends regions is then cut transversely to the axes of the constituent fibers. A portion of the cut ends region on either side of the cut becomes one of (i) the input end and (ii) the output end of the image bundle. It will be readily appreciated that, by such a method, the positional correspondence of the entrance and exit ends of each fiber within, respectively, the input and output ends of the image bundle is assured.

As previously alluded to, image bundles formed in general accordance with the aforementioned method, or a method similar in result, are used in a wide variety of applications. In order to protect, and sometimes direct, the flexible portions of the constituent fibers of an image bundle, at least the intermediate flexible region is housed in a rigid, pipe-like housing or a flexible, sleeve-like housing. It is sometimes necessary when housing intermediate regions to clamp or bend them, but doing so may cause stress or damage to flexible regions of fibers within the bundle. Accordingly, there exists a need for a an image bundle that is at least partially flexible between rigidly fixed input and output ends, but that includes at least one rigid region intermediate the input and put ends, and methods of fabricating the same.

SUMMARY

In one typical implementation, each light-conducting fiber of a plurality of light-conducting fibers is wound about a mandrel in order to form a plurality of individual fiber ribbons each of which fiber ribbons is in the form of a fiber helix including a continuously wound light-conducting fiber having close-fitting convolutes. A selected portion of each fiber helix is laterally bonded in order to form an ends region in which portions of the continuous fiber are fixed in side-by-side relationship. Each fiber helix of the plurality is removed from the mandrel about which it was wound and the ends regions of plural helixes are stacked in superimposed relationship and bonded together to form a fiber bundle including a unitary (e.g., rigid) ends section comprising the adjacently-bonded ends regions of the constituent helixes. The securely bonded ends section is subsequently cut transversely in a direction including a component of displacement transverse to the wind direction of the convolutes in order to form an image-conducting bundle with distinct and opposed input and output ends. At least one rigid intermediate section is formed along the length of the bundle by (i) bonding fiber portions of each fiber ribbon along an intermediate region not corresponding to the ends region of that ribbon, but coinciding with a corresponding intermediate region of each of the other fiber ribbons and (ii) mutually bonding corresponding intermediate regions of the fiber ribbons of the fiber bundle in order to form within the bundle at least one rigid intermediate section.

In accordance with one, more specific illustrative implementation, the steps of (i) bonding fibers of each fiber ribbon along an intermediate region not corresponding to the ends region of that ribbon, but coinciding with a corresponding intermediate region of each of the other fiber ribbons and (ii) bonding corresponding intermediate regions of the fiber ribbons are performed in distinct stages. More specifically, a selected intermediate portion of each fiber ribbon is laterally bonded in order to form an intermediate region in which portions of the continuous fiber are fixed in side-by-side relationship one of (i) prior to removal from the mandrel, (ii) after removal from the mandrel and before cutting across the ends region, and (iii) after cutting across the ends region. The intermediate regions of the plural fiber ribbons are then stacked in superimposed relationship and bonded together to form a fiber bundle including a unitary intermediate section comprising adjacently-bonded intermediate regions of the constituent fiber ribbons one of (i) prior to cutting across the ends region and (ii) after cutting across the ends region.

In various versions, the bonding of fibers, whether in an ends region or section or an intermediate region or section, is achieved by the application of a curable bonding agent such as at least one of an epoxy, glue or cement. In alternative versions, fiber bonding is accomplished by one of (a) the inclusion within and (b) application upon at least selected portions of constituent fibers an outer cladding layer of material having a predetermined softening temperature, bringing into adjacent contacting engagement at least two selected fiber portions exhibiting the outer cladding material, and heating the adjacently contacting selected fiber portions to a temperature at least as high as the predetermined softening temperature. Some implementations may include variations of both general bonding operations described above. In addition, some versions include pressing together (e.g., compressing) the fibers along either of the ends and intermediate sections as they are bonded. It will be appreciated that in various implementations in which an outer cladding is applied to fiber that is wound into a helix, the bonding agent is applied at a time prior to the winding about the mandrel, but not "activated" (e.g., by selective application of heat) until after the fiber is wound. This contrasts, for instance, with some implementations in which a bonding agent, such as a heat-sensitive glue or epoxy, is applied to selected regions of fibers either while the fiber is wound about the mandrel or subsequent to the removal therefrom. In various instances of the latter implementations, the epoxy, glue or other bonding adhesive is typically initially applied in a fluid form and allowed to cure by, for instance, exposure to air or light. When subsequent "reactivation" of the bonding agent is required, regions of fibers to which the agent was previously applied are heated to soften the bonding agent for fusing to desired, adjacent structures, and then permitted to "re-cure."

In still additional implementations, the formation of rigid a intermediate region along the length of a constituent fiber ribbon and the formation of an intermediate section comprised of rigid intermediate regions are accomplished contemporaneously, either before or after the ends section is cut. Illustrative variations on such alternative processing are provided in the detailed description. The rigid regions and sections formed in accordance with alternative versions may be straight or curved depending on the particular intended application of the final image bundle.

In accordance with one implementation, a plurality of individual fiber helixes is formed by winding each of a plurality of continuous light-conducting fibers about a mandrel such that each fiber helix includes a continuously wound light-conducting fiber having close-fitting convolutes. Fiber portions of a first selected set of adjacent portions of the continuous fiber of each fiber helix are mutually bonded with a heat-sensitive bonding agent that softens at a predetermined softening temperature in order to form a helical fiber ribbon with an ends region in which the selected adjacent portions of the continuous fiber are fixed in side-by-side relationship. Fiber portions of a second selected set of adjacent portions of the continuous fiber of each helical fiber ribbon are mutually bonded along at least one intermediate region not corresponding to the ends region of that fiber ribbon, but corresponding (e.g., calculated to correspond) with an intermediate region of each of the other fiber ribbons among the plurality of fiber ribbons. In a manner analogous to the bonding of fiber portions to form the ends region, the fiber portions of the second selected set of fiber portions are adjacently bonded with a heat-sensitive bonding agent that softens at a predetermined softening temperature.

Each helical fiber ribbon is removed from the mandrel about which it was wound and the ends regions of plural fiber ribbons are stacked in superimposed relationship with the fiber portions within the stacked ends regions extending along, but not necessarily parallel to, a common axis. The superimposed ends regions are bonded together to form a fiber bundle including a unitary ends section comprising the mutually and adjacently-bonded ends regions of the constituent fiber ribbons. The adjacent bonding of the ends regions is achieved by at least one of (i) heating the heat-sensitive bonding agent with which the ends regions were formed to a temperature at least as high as the predetermined softening temperature and (ii) pressing the stacked ends regions together.

With the ends regions of plural constituent fiber ribbons mutually bonded, a cut is made across the ends section of the fiber bundle in a direction including a component of displacement transverse to the wind direction of the convolutes of each constituent fiber ribbon in order to form an image-conducting bundle with distinct and opposed input and output ends exhibiting, respectively, input and output faces. Each of the input and output ends includes a portion of the ends region of each of the fiber ribbons included within the fiber bundle. Subsequent to the cutting of the ends section of the fiber bundle, each constituent fiber ribbon included in the fiber bundle is itself comprised of plural constituent fibers having adjacent, coinciding portions thereof adjacently bonded in the at least one intermediate region not corresponding to the ends region of that ribbon.

Corresponding intermediate regions of plural fiber ribbons of the fiber bundle are mutually bonded in order to form within the bundle at least one rigid intermediate section, wherein the adjacent bonding of the intermediate regions is achieved by at least one of (i) heating the heat-sensitive bonding agent with which the intermediate regions were formed to a temperature at least as high as the predetermined softening temperature and (ii) pressing the stacked intermediate regions together. In alternative versions, the intermediate regions of plural fiber bundles are mutually bonded one of (i) prior to cutting through the ends section and (ii) subsequent to cutting through the ends section.

A typical implementation is designed to yield a fiber bundle that is at least partially flexible. Accordingly, in a typical version, the sum of the lengths of the ends section and the at least one intermediate section is less than the length of the fiber bundle such that the fiber bundle is flexible along at least a portion of its length.

In various alternative versions, the adjacent bonding of at least one of (i) intermediate regions and (ii) ends regions of plural fiber ribbons to form at least one of, respectively, a rigid intermediate section and a rigid ends section is performed within a channel of a die. The die channel has predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel. The "length-shaping" configuration is the shape of the die channel along the direction in which fibers disposed therein extend lengthwise. In various implementations, fibers are adjacently bonded within a die channel having a straight (non-bent) length-shaping configuration. In alternative implementations, at least one of the at least one intermediate sections of a fiber bundle is formed by a die channel including a curve along the length-shaping configuration thereof such that the at least one intermediate section formed within the die assumes a curved configuration along at least a portion of the length thereof. Also within the scope and contemplation of the inventive methods is the use of a curved die channel to form a curved ends section when, for instance, a particular application requires a rigid bend in the fiber bundle along a portion of the fiber bundle length proximate at least one of the input and output faces of the fiber bundle.

Representative, non-limiting implementations are more completely described and depicted in the following detailed description and the accompanying drawings.

BRIEF DESCRIPTION OF THE DRAWINGS

FIG. 1 shows a continuous light-conducting fiber being wound about a mandrel to form a fiber helix;

FIG. 2 indicates the mutual bonding, with the fiber helix of FIG. 1 still on the mandrel, of a first selected set of adjacent portions of the continuous fiber of fiber helix in order to form a helical fiber ribbon with an ends region in which the selected adjacent portions of the continuous fiber are fixed in side-by-side relationship;

FIG. 15 depicts steps in an illustrative method of fabricating an optical fiber bundle having at least one rigid intermediate region.

DETAILED DESCRIPTION

Figure 3:
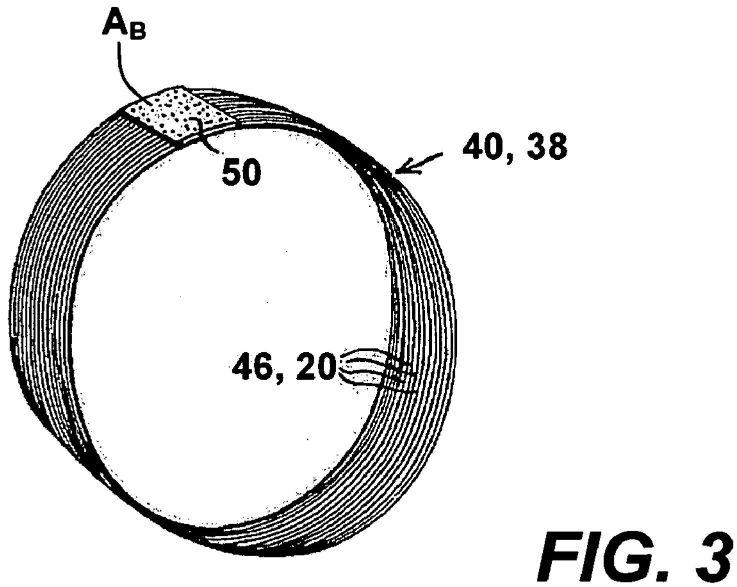
FIG. 3 depicts a helical fiber ribbon removed from the mandrel about which it was wound and including an ends region of adjacently-bonded fiber portions.
Figure 4:
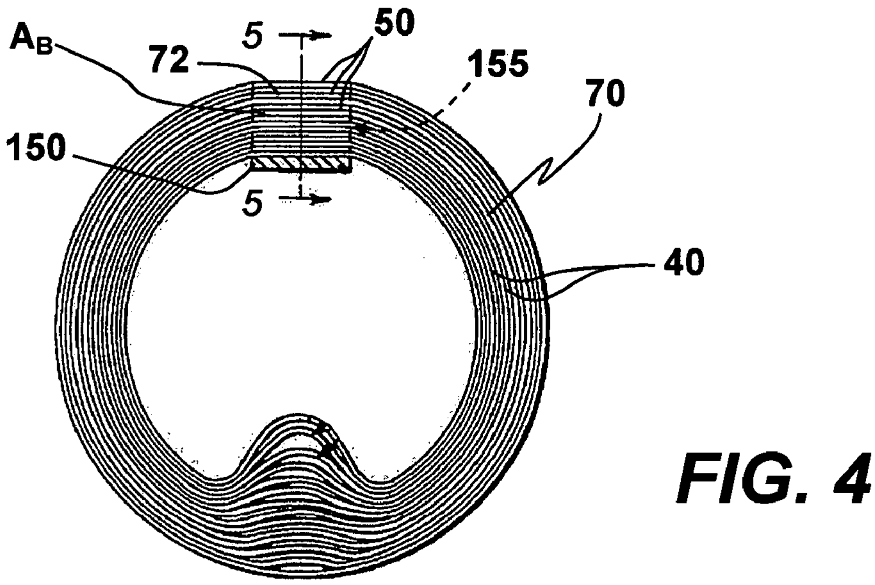
FIG. 4 shows the stacking in superimposed relationship, and mutual bonding, of the ends regions of plural helical fiber ribbons within the channel of a die to form a fiber bundle including a unitary ends section comprising the adjacently-bonded ends regions of the constituent helical fiber ribbons.
Figure 5:
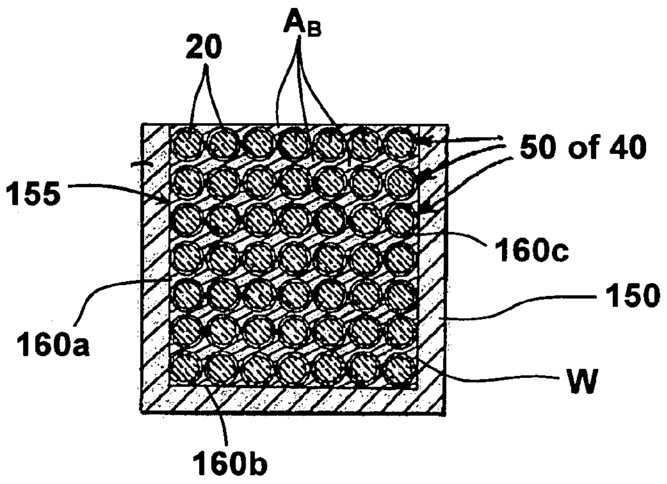
FIG. 5 is a cross sectional view into the plane 5-5 of FIG. 4 which passes through the stacked ends regions of a helical fiber ribbon.
Figure 6:
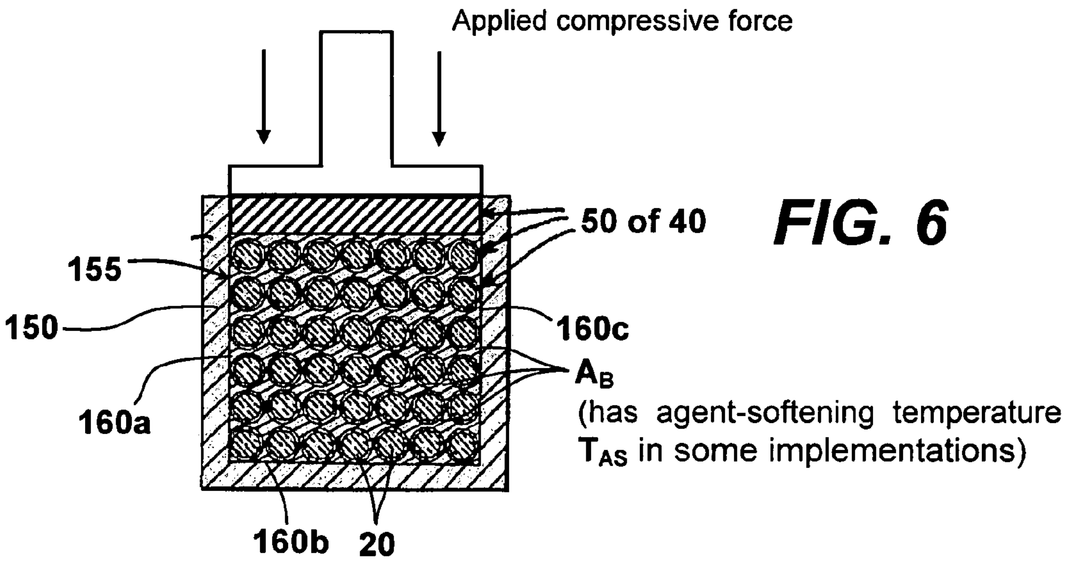
FIG. 6 shows a cross-sectional view like that of FIG. 5, but in which the stacked ends regions are being pressed under the load of an applied compressive force.

The following description of methods of fabricating an image bundle having a rigid intermediate region is demonstrative in nature and is not intended to limit the invention or its application of uses. The various implementations, aspects, versions and embodiments described in the summary and detailed description are in the nature of non-limiting examples falling within the scope of the appended claims and do not serve to define the maximum scope of the claims.

FIGS. 1 through 14 depict illustrative components and apparatus used in the fabrication of an image bundle and characteristics of image bundles fabricated in accordance with implementations of the invention. In conjunction with FIGS. 1 through 14, an illustrative method of fabricating an image bundle is described below and depicted in FIG. 15. More specifically, FIG. 15 depicts illustrative method steps associated with a method of fabricating an image bundle and FIGS. 1 through 14 depict physical apparatus and schematic representations of physical properties associated with the method of FIG. 15. It should be noted that the sequence of steps presented in FIG. 15 and the text to follow is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context (e.g., an instance in which it is impossible to perform a particular step prior to the performance of another step.).

Referring to FIGS. 1, 1A and 15, in accordance with step 510, a continuous light-conducting fiber 20 having an optical core 22 and optical cladding 24 is wound about a mandrel 100 in order to form a fiber helix 38 having close-fitting convolutes 46. FIG. 1A is a magnified cross-section of the illustrative light-conducting fiber 20, and shows the fiber core 22 and the optical cladding 24 thereof. At step 520, a selected first portion 48 of the fiber helix 38 is laterally bonded, as shown for example in FIGS. 1 and 2, in order to form a helical fiber ribbon 40 with an ends region 50 in which ends region 50 a first selected set of fiber portions 28 of the continuous fiber 20 of the helical fiber ribbon 40 are fixed in side-by-side relationship. The bonding of the fiber portions 28 is accomplished, for example, by the application of curable bonding agent $A_B$ such as an epoxy, glue or cement.

Referring to FIG. 3, and step 530 of FIG. 15, the helical fiber ribbon 40 is removed from the mandrel 100. Plural such fiber ribbons 40 are formed and, in accordance with step 540, the ends regions 50 of plural helical fiber ribbons 40 are stacked in superimposed relationship and bonded together to form a fiber bundle 70 including a unitary ends section 72 comprising the adjacently-bonded ends regions 50 of the constituent helical fiber ribbons 40 as shown, for example, in FIG. 4. The manner in which the ends regions 50 are bonded varies in alternative implementations. According to one illustrative implementation, the stacking and bonding of the ends regions 50 of the helical fiber ribbons 40 is facilitated by a form or die 150 having a U-shaped channel 155 therein selected to be of a width corresponding to the width of the fiber ribbons 40 and receive the side edges of the fiber ribbons 40 in the manner illustrated more particularly in the cross-sectional view of FIG. 5. The first illustrative assembly operation includes placing the helical fiber ribbons 40 one at a time, with the bonded ends region 50 of each one in superimposed stacked relation with the bonded ends region 50 of another fiber ribbon 40 already in place in the channel 155, and applying a thin layer of curable bonding agent $A_B$ (e.g., heat-sensitive cement or glue) between the stacked ends regions 50 in order to rigidly secure them together within the channel 155 and, ultimately, form the unitary ends section 72 of the fiber bundle 70. In order to facilitate the removal of the unitary ends section 72 from the channel 155 of the die 150, the interior surfaces 160*a, b* and *c* defining the channel 155 may have applied to them a layer of material (e.g., wax W) prior to the stacking and bonding operation to prevent the curable bonding agent $A_B$ from adhering thereto. Alternatively, it may be desirable to allow the form 150 to become rigidly secured to the unitary ends section 72 and have a portion thereof serve as a housing at each end of the image bundle 70 subsequent to the cutting operation described below.

In another alternative method by which the ends regions 50 of the fiber ribbons 40 are mutually stacked and bonded, a bonding agent $A_B$ having a predetermined agent-softening temperature $T_{AS}$ (see FIG. 6) below the softening temperature of at least the optical core 22, but more typically below the softening temperatures of both the cladding 24 and the core 22 of the fiber 20, is used to treat (e.g., "paint" on/across) the adjacent selected fiber portions 28 in the initial formation of the ends region 50 of each of the fiber ribbons 40. Subsequently, the ends regions 50 of plural helical fiber ribbons 40 are stacked in the channel 155 of a form 150, such as that described in connection with the first illustrative stacking and bonding operation, and shown in FIGS. 4 and 5, and then heated to a predetermined temperature high enough to soften the bonding agent $A_B$, but low enough to avoid softening the optical cores 22 and claddings 24 of the fibers 20 from which the helical fiber ribbons 40 are formed. In some versions in which heat is applied, the ends regions 50 of the fiber ribbons 40 are also pressed, as shown schematically in the cross-sectional view of FIG. 6, in order to facilitate flow of the curable bonding agent $A_B$ between the layered ends regions 50 and, where applicable, to the interior surfaces 160*a, b* and *c* of the form 150 when, for instance, the form 150 is to be secured to the ends regions 50 as part of the unitary ends section 72.

Figure 7:
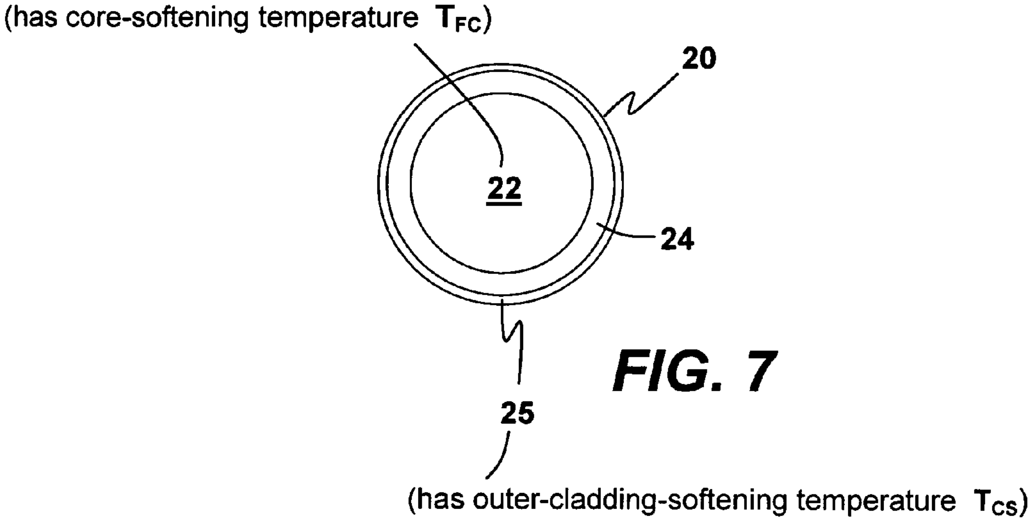
FIG. 7 depicts a cross section of fiber from which an illustrative fiber ribbon is fabricated, wherein the fiber includes a fiber core encased in an optical cladding which is, in turn, encased in an outer cladding that has a softening temperature typically lower than the softening temperatures of the fiber core and the optical cladding.
Figure 7A:
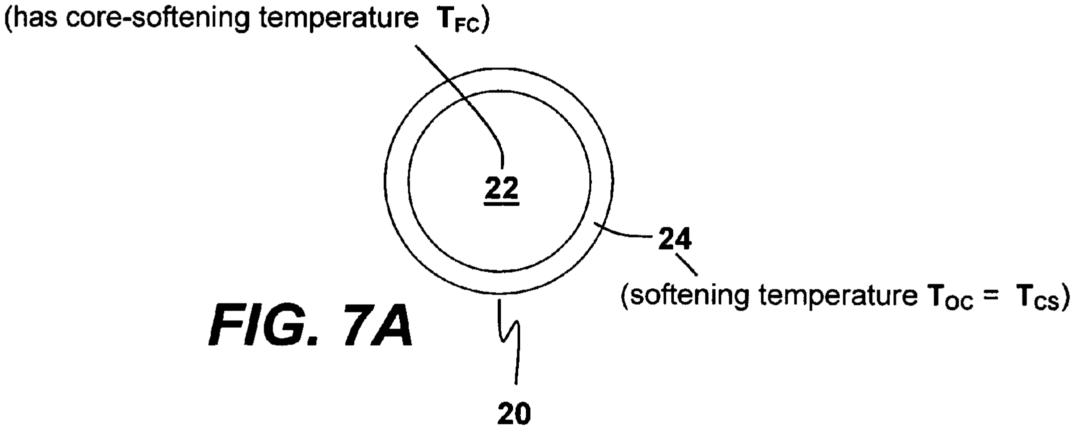
FIG. 7A shows a cross section of an alternative fiber in which the outer cladding is one and the same with the optical cladding.

In still another illustrative stacking and bonding operation described in conjunction with FIGS. 7 and 7A, the continuous fiber 20 from which each of the fiber ribbons 40 is fabricated includes an outer cladding 25 having an outer-cladding-softening temperature $T_{CS}$ lower than the softening temperature $T_{FC}$ of at least the fiber core 22. Although, in a typical implementation, the outer cladding 25 is distinct from, and to the outside of, the optical cladding 24, as in the fiber cross section of FIG. 7, envisioned within the scope and contemplation of the invention are versions in which the outer cladding 25 is one and the same with the optical cladding 24, as in the fiber cross section of FIG. 7A. Typically, when the outer cladding 25 is distinct from the optical cladding 24, the outer cladding 25 is selected so as to have an outer-cladding-softening temperature $T_{CS}$ lower than the softening temperature $T_{OC}$ of the optical cladding 24. In at least one of (i) the formation of the ends regions 50 of the fiber ribbons 40 and (ii) the formation of the unitary ends section 72 of the fiber bundle 40, heat is applied in order to soften the outer cladding 25 and cause the selected fiber portions 28 and/or the ends regions 50 of the fiber ribbons 40 to mutually fuse. That is, in order to soften the outer cladding 25 sufficiently for so that it acts as bonding agent $A_B$.

It is to be understood in connection with the illustrative stacking and bonding operations described above, the application of a bonding agent $A_B$ and the application of heat to soften an outer cladding 25, for example, are not mutually exclusive bonding methods and, therefore, variations of each may be incorporated into a particular implementation.

Figure 8:
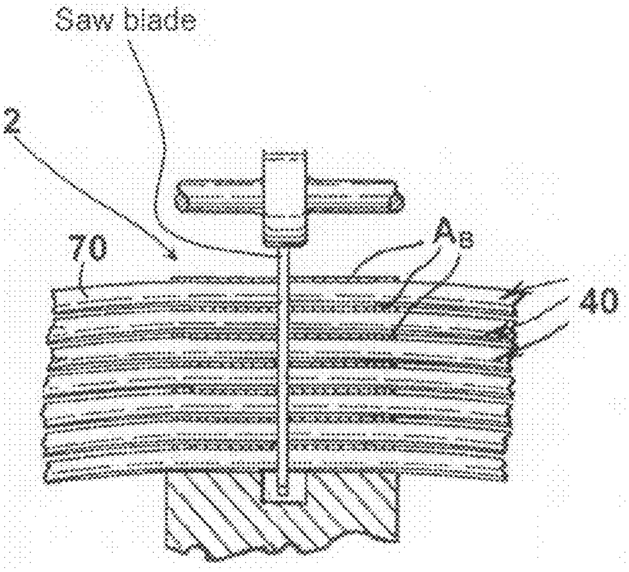
FIG. 8 illustrates the cross-wise cutting through, by a saw blade, of a unitary ends section in order to form an image-conducting bundle with opposed rigid input and output ends.
Figure 9:
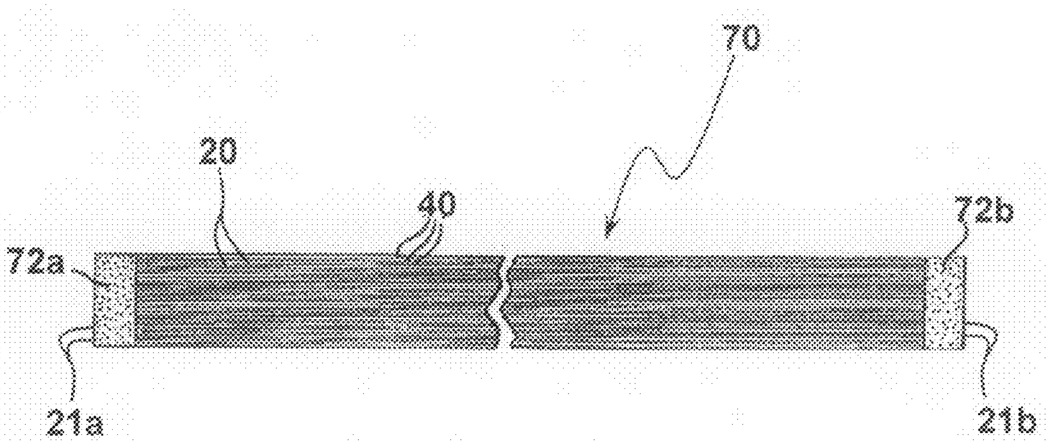
FIG. 9 shows a fiber bundle after the cutting of the unitary ends section.

Referring to step 550 in FIG. 15 and FIG. 8, the unitary ends section 72 is cut cross-wise in a direction including a component of displacement transverse to the wind direction of the convolutes 46 in order to form an image-conducting bundle 70, such as the image bundle 70 of FIG. 9, with distinct and opposed input and output ends 72*a* and 72*b*. The unitary ends section 72 can be cut with any suitable instrument, but is schematically represented in FIG. 8 as being cut with a saw. It will be appreciated that, subsequent to the cutting of the ends section 72, each constituent fiber ribbon 40 of the fiber bundle 70 is itself comprised of, instead of a single continuous fiber 20, plural constituent fibers 20. Moreover, each constituent fiber 20 has a first end 21*a* and a second end 21*b*, coinciding with, respectively, the opposed input and output ends 72*a* and 72*b* of the fiber bundle 70 as shown, for example, in FIG. 9.

Steps 560 and 570 indicate, respectively, (i) mutually bonding fibers 20 of each fiber ribbon 40 along an intermediate region not corresponding to the ends region 50 of that fiber ribbon 40, but coinciding with a corresponding intermediate region of each of the other fiber ribbons 40 (i.e., the at least one other fiber ribbon 40) and (ii) mutually bonding corresponding intermediate regions of the fiber ribbons 40 of the fiber bundle 70 in order to form within the bundle 70 at least one rigid intermediate section 60. It will be appreciated, particularly with the aid of the explanation provided in subsequent paragraphs, and the referenced drawings associated therewith, that steps 560 and 570 may be performed as distinct operations or as part of a combined operation and, furthermore, that they may be performed at various times relative to other steps in an overall image-bundle fabrication process. Moreover, even sub-operations constituting a part of each of steps 560 and 570 may be performed at various times relative to one another and relative to the operations performed in association with steps other than 560 and 570.

Figure 10:
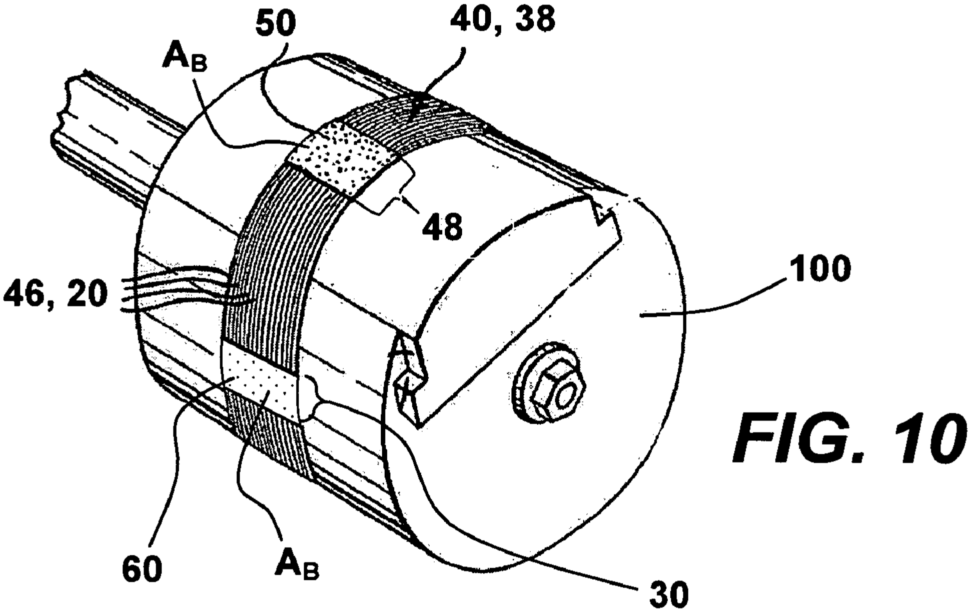
FIG. 10 indicates the adjacent, mutual bonding of a selected set of adjacent portions of the continuous fiber of a fiber helix, while the fiber helix is still on the mandrel about which it was wound, in order to define an intermediate region distinct from an ends region, such as the ends region shown in FIG. 2.
Figure 11:
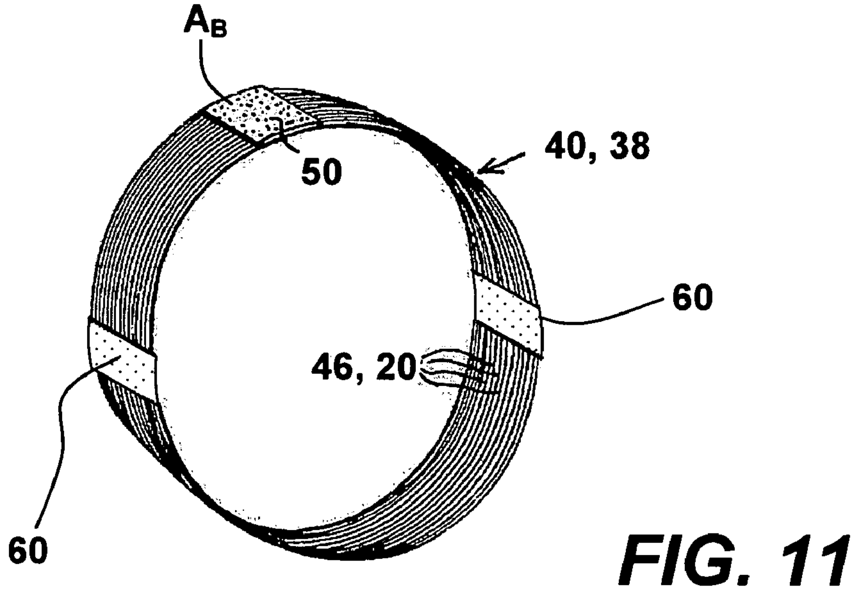
FIG. 11 shows the illustrative fiber ribbon of FIG. 10 removed from the mandrel about which it was wound, the illustrative fiber ribbon having an ends region and two intermediate regions.
Figure 11A:
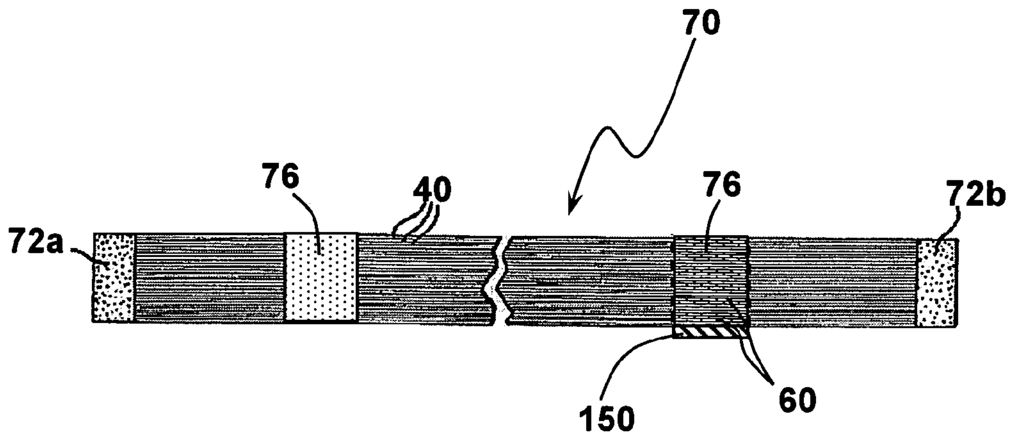
FIG. 11A shows a fiber bundle formed by the stacking, bonding and cutting through of the ends regions of plural fiber ribbons and the formation of two intermediate sections by adjacent mutual bonding of plural, stacked intermediate regions in two separate locations along the length of the fiber bundle, wherein the intermediate section on the left is already bonded and cured and the intermediate section on the right is undergoing bonding within a die.

Referring to FIG. 10, selected portions 30 of the continuous, helically wound fiber 20 have been adjacently bonded by the application of a bonding agent $A_B$ with the fiber 20 still on the mandrel 100 to define, in fulfillment of step 560, an intermediate region 60 distinct from the ends region 50, which has also been formed with the wound fiber 20 still on the mandrel 100. Once multiple (two or more) fiber ribbons 40 including intermediate regions 60 have been removed from the mandrel 100 (FIG. 11), the intermediate regions 60 of two or more fiber ribbons 40 are stacked and mutually bonded to form a rigid intermediate section 76, as shown in FIG. 11A. However, unlike the ends section 72 of a fiber bundle 70 in which positional correspondence of the ends 21*a* and 21*b* of each fiber 20 within input and output ends 72*a* and 72*b* of the fiber bundle 70 is essential, as explained above, relative positioning of fibers 20 within a rigid intermediate section 76 of the finished fiber bundle 70 is typically immaterial to the overall functionality of the image bundle 70 and, more particularly, to the preservation of transferred-image integrity. Moreover, an intermediate section 76 is, by definition established herein, not cut. Accordingly, the intermediate regions 60 of two or more fiber ribbons 40 may be stacked and bonded prior to or subsequent to the cuffing of the ends section 72 of the fiber bundle 70, although, as a practical matter, stacking and bonding the intermediate regions 60 of plural fiber ribbons 40 may generally prove more manageable subsequent to the cutting of the ends section 72 of the fiber bundle 70 because the fiber bundle 70 can be longitudinally spread out to facilitate the operation.

FIG. 11A illustrates the stacking and bonding of plural intermediate regions 60 subsequent to the cutting of the ends section 72 to form the intermediate section 76 of a fiber bundle 70. It will be appreciated that forming the intermediate sections 76 subsequent to cutting through the ends section 72 is especially apposite when either (i) several, relatively close rigid intermediate sections 76 are to be formed and/or (ii) the fiber bundle 70 is to include at least one relatively long rigid intermediate section 76. The particular manners by which the actual stacking and bonding of the intermediate regions 60 are achieved may correspond to the manners in which the stacking and bonding of the ends regions 50 are achieved, including the illustrative, non-limiting manners explained above in conjunction with, for example, FIGS. 4 through 7A. In the illustrative example of FIG. 11A, the intermediate section 76 on the left is already bonded with a cured bonding agent $A_B$ and the intermediate section 76 on the right is undergoing bonding within a die 150 in a manner analogous to the manner in which the use of a die 150 to form an ends section 72 was previously depicted and described in association with FIGS. 4 through 6.

Figure 12:
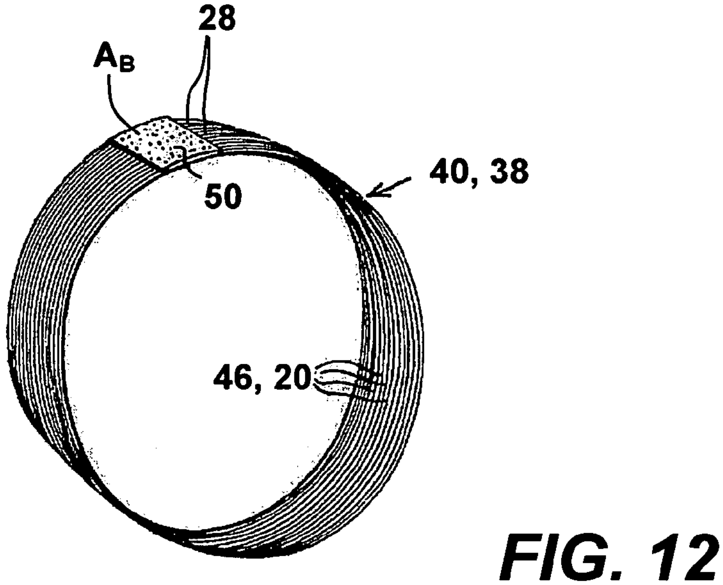
FIGS. 12 and 12A depict, respectively, (i) a helical fiber ribbon removed from a mandrel (not shown) about which it was wound and including a bonded ends region and (ii) the formation of two intermediate regions within the fiber bundle of FIG. 12 subsequent to the removal of the bundle from the mandrel.
Figure 12A:
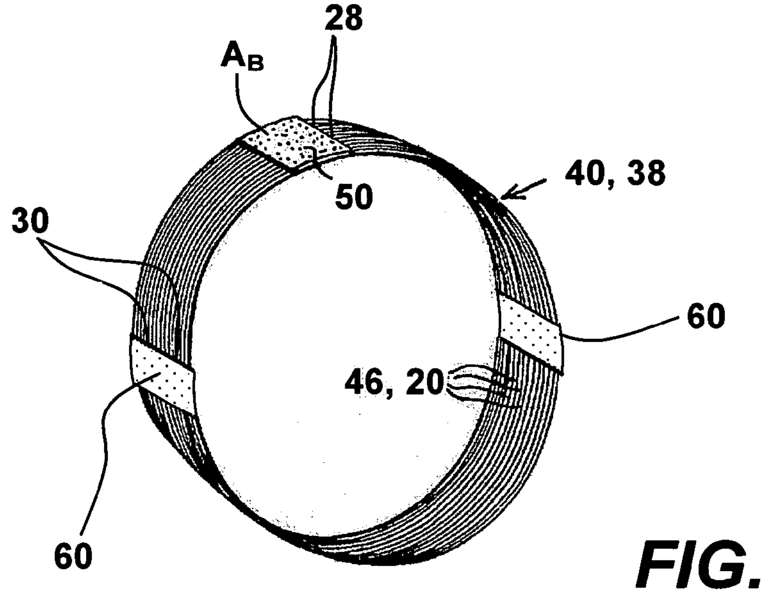
Figure 13:
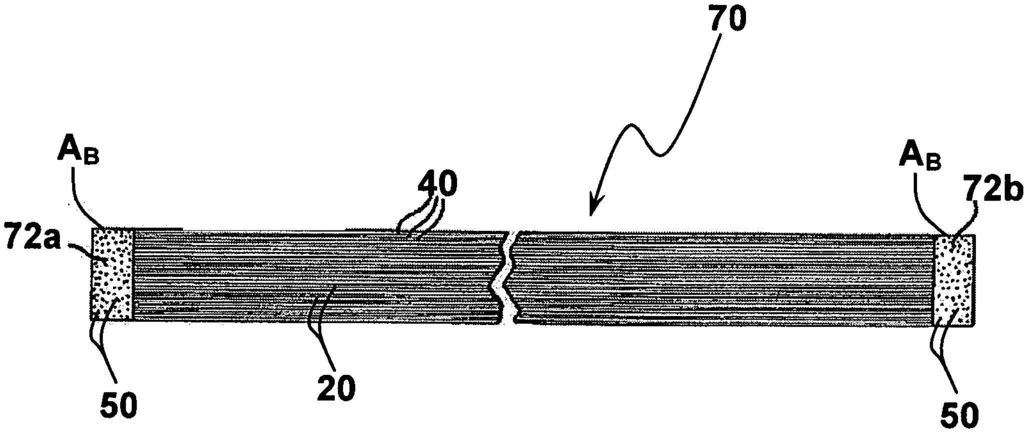
FIGS. 13 and 13A show, respectively, (i) a fiber bundle comprising plural fiber ribbons with ends regions that have been mutually fused to form an ends section that has been cut through to form input and output ends of the fiber bundle and (ii) the contemporaneous formation of intermediate regions and intermediate sections between the input and output ends of the bundle of FIG. 13.
Figure 13A:
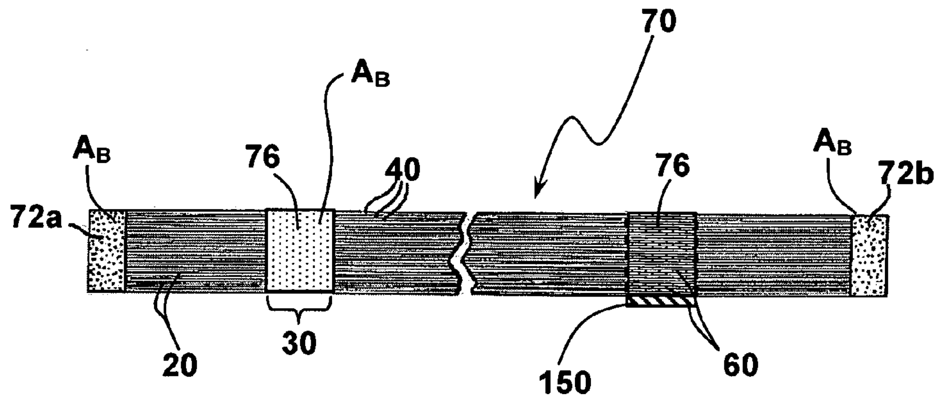

In another alternative set of operations performed to achieve steps 560 and 570, each helical fiber ribbon 40 is removed from the mandrel 150 about which it was wound with selected portions 28 of the continuous fiber 20 adjacently bonded within the ends region 50, as shown in FIG. 12. With the ends region 50 still uncut, one or more intermediate regions 60 is formed along the helical fiber ribbon 40 by the adjacent bonding of the continuous fiber 20 along selected portions 30 not corresponding the ends region 50, as shown in FIG. 12A. An intermediate region 60 formed in this manner is then stacked and bonded with a corresponding intermediate region 60 of at least one other fiber ribbon 40 in, by way of non-limiting example, a manner consistent with either of the general manners described in the preceding paragraph. That is, either prior to or subsequent to the cutting of the ends section 72 of the fiber bundle 70.

Explained in conjunction with FIG(S) 13 and 13A is another set of illustrative operations toward the fulfillment of steps 560 and 570. The ends regions 50 of multiple fiber ribbons 40 are mutually bonded to form a fiber bundle 70. Subsequently, corresponding intermediate portions 30 of the fibers 20 within the fiber bundle 70 are adjacently bonded to form a rigid intermediate section 76 along the fiber bundle 70 without the previous formation of intermediate regions 60 along each ribbon 40. As with previously described illustrative operations, the formation of one or more intermediate sections 76 may be performed prior to or subsequent to the cutting of the ends section 72. It will be appreciated that the operations currently under discussion result in the intermediate section 76 and the multiple intermediate regions 60 of the fiber ribbons 40 comprising the intermediate section 76 being formed contemporaneously and indistinguishably. Moreover, the portions 30 of fibers 20 of what were previously multiple fiber bundles 40 may be adjacently intermixed at the time of mutual bonding. As previously explained, such intermixing will, in the typical version, have no bearing on the functionality of the fiber bundle 70 since "well-orderedness" of fiber portions within the input and output ends 72*a* and 72*b* is what determines image-transfer integrity.

Figure 14:
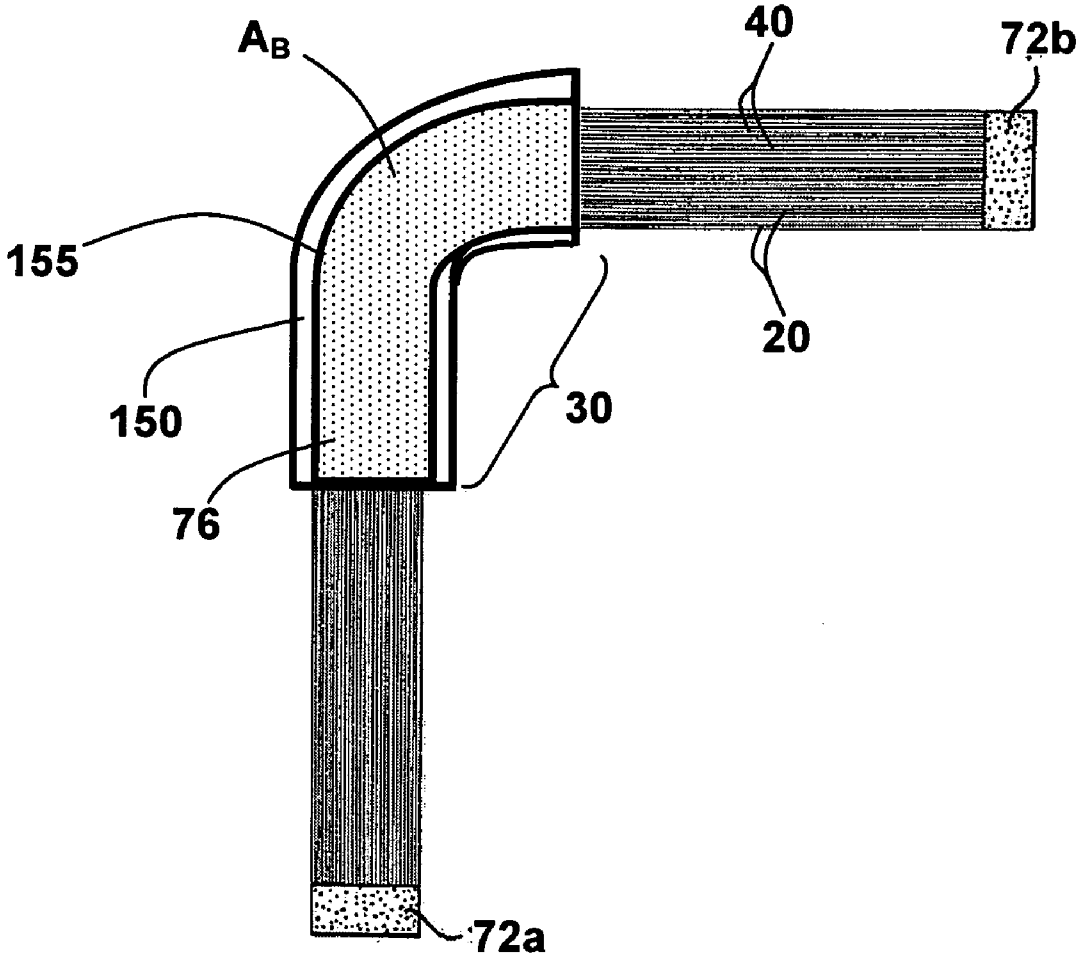
FIG. 14 depicts the formation of a curved intermediate region within the curved, length-shaping channel of a die.

As previously indicated, and presently discussed in more detail with reference to FIG. 14, intermediate sections 76 of fiber bundles 70 may be formed in a die 150 having a channel 155 in a manner analogous to which ends sections 72 are formed. While a typical channel 155 imparts upon an ends section 72 or intermediate section 76 a cross section that is, for example, rectangular, square or circular, it will also have a predetermined configuration along its length for the purpose of shaping a length of an intermediate section 76 or ends section 72 formed therein. In alternative implementations, the "length-shaping" configuration (as opposed to the cross-sectional channel configuration) of the die channel 155 is at least one of (i) straight and (ii) curved. A die channel 155 that introduces a curve along a portion of the length of an intermediate section 76 of a fiber bundle facilitates "pre-bending" of constituent fibers 20 and permanent "setting" of a bend or curve under controlled conditions. Such pre-setting reduces the potential for stress on fibers 20 when they are introduced into housing or other environments in which bends are required (not shown). Moreover, as with straight and rigid intermediate sections 76 and ends sections 72, curved sections 76 and 72 also provide a place to clamped or otherwise retain the fiber bundle 70 without damaging flexible fiber portions. FIG. 14 shows the formation of a curved intermediate section 76 in which selected portions 30 of fibers 20 are being bonded with a bonding agent $A_B$. Although FIG. 14 shows a curved intermediate section 76 being formed within a curved die channel 155, it will be readily appreciated that curved ends sections 72 may be similarly formed and, therefore, FIG. 14 and the associated discussion are regarded as sufficient disclosure of the formation of curved ends sections 72.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A method of fabricating an image-conducting optical fiber bundle having at least one rigid intermediate section, the method comprising:

winding a plurality of continuous light-conducting fibers about a mandrel in order to form a plurality of individual fiber ribbons each of which fiber ribbons is in the form of a fiber helix including a continuously wound light-conducting fiber having close-fitting convolutes;

laterally bonding a selected portion of each fiber helix in order to form an ends region in which portions of the continuous fiber are fixed in side-by-side relationship;

removing each fiber helix from the mandrel about which it was wound;

stacking the ends regions of plural helixes in superimposed relationship and bonding the superimposed ends regions together to form a fiber bundle including a unitary ends section comprising the adjacently-bonded ends regions of the constituent helixes;

cutting across the ends section in a direction including a component of displacement transverse to the wind direction of the convolutes of each constituent fiber ribbon in order to form an image-conducting bundle with distinct and opposed input and output ends, each of which input and output ends includes a portion of the ends region of each of the fiber ribbons included within the fiber bundle, wherein, subsequent to the cutting of the ends section of the fiber bundle, each constituent fiber ribbon included in the fiber bundle is itself comprised of plural constituent fibers;

mutually bonding one of (i) adjacent portions of the continuous fiber of each fiber ribbon and (ii) adjacent portions of constituent fibers of each fiber ribbon along an intermediate region not corresponding to the ends region of that ribbon, but coinciding with a corresponding intermediate region of each of the other fiber ribbons; and mutually bonding corresponding intermediate regions of the fiber ribbons of the fiber bundle in order to form within the bundle at least one rigid intermediate section.

2. The method of claim 1 wherein the steps of (a) mutually bonding one of (i) adjacent portions of the continuous fiber of each fiber ribbon and (ii) adjacent portions of constituent fibers of each fiber ribbon along an intermediate region not corresponding to the ends region of that ribbon, but coinciding with a corresponding intermediate region of each of the other fiber ribbons and (b) mutually bonding corresponding intermediate regions of the fiber ribbons comprise:

laterally bonding one of (i) a selected intermediate portion of each fiber ribbon in order to form an intermediate region in which portions of the continuous fiber are fixed in side-by-side relationship one of (a) prior to removal from the mandrel and (b) after removal from the mandrel and before cutting across the ends region and (ii) adjacent portions of constituent fibers of each fiber ribbon after cutting across the ends region; and stacking at least one of (i) intermediate portions and (ii) intermediate regions of plural fiber ribbons in superimposed relationship and bonding the superimposed at least one of (i) intermediate portions and (ii) intermediate regions together to form a fiber bundle including a unitary intermediate section comprising adjacently-bonded intermediate regions of the constituent fiber ribbons one of (i) prior to cutting across the ends region and (ii) after cutting across the ends region of each fiber ribbon.

3. The method of claim 2 wherein bonding of fibers is achieved by at least one of:

(i) the application to the fibers of at least one of an epoxy, glue or cement; and (ii) one of (a) the inclusion within and (b) application upon at least selected portions of constituent fibers a cladding layer of material having a predetermined softening temperature, bringing into adjacent contacting engagement at least two selected fiber portions exhibiting the material, and heating the adjacently contacting selected fiber portions to a temperature at least as high as the predetermined softening temperature.

4. The method of claim 2 wherein the adjacent bonding of at least one of (i) intermediate portions and (ii) intermediate regions of plural fiber ribbons is performed within a channel of a die, the channel having predetermined cross-sectional and length-shaping configurations such that a fiber bundle including a unitary intermediate section having a configuration corresponding to the configuration of the die channel is formed, wherein the length-shaping configuration is at least one of (a) straight and (b) curved.

5. A method of fabricating an image-conducting optical fiber bundle having at least one rigid intermediate section, the method comprising:

winding each of a plurality of continuous light-conducting fibers about a mandrel in order to form a plurality of individual fiber helixes, each of which fiber helixes includes a continuously wound light-conducting fiber having close-fitting convolutes;

mutually bonding a first selected set of adjacent portions of the continuous fiber of each fiber helix with a heat-sensitive bonding agent that softens at a predetermined softening temperature in order to form a helical fiber ribbon with an ends region in which the selected adjacent portions of the continuous fiber are fixed in side-by-side relationship;

mutually bonding at least a second selected set of adjacent portions of the continuous fiber of each helical fiber ribbon along at least one intermediate region not corresponding to the ends region of that fiber ribbon, but corresponding with an intermediate region of each of the other fiber ribbons among the plurality of fiber ribbons;

removing each helical fiber ribbon from the mandrel about which it was wound;

stacking the ends regions of plural fiber ribbons in superimposed relationship and bonding the superimposed ends regions together to form a fiber bundle including a rigid ends section comprising the adjacently-bonded ends regions of the constituent fiber ribbons, wherein the adjacent bonding of the ends regions is achieved by at least one of (i) heating the heat-sensitive bonding agent with which the ends regions were formed to a temperature at least as high as the predetermined softening temperature and (ii) pressing the stacked ends regions together;

cutting across the ends section of the fiber bundle in a direction including a component of displacement transverse to the wind direction of the convolutes of each constituent fiber ribbon in order to form an image-conducting bundle with distinct and opposed input and output ends, each of which input and output ends includes a portion of the ends region of each of the fiber ribbons included within the fiber bundle, wherein, subsequent to the cutting of the ends section of the fiber bundle, each constituent fiber ribbon included in the fiber bundle is itself comprised of plural constituent fibers having adjacent, coinciding portions thereof adjacently bonded in the at least one intermediate region not corresponding to the ends region of that ribbon; and mutually bonding corresponding intermediate regions of the fiber ribbons of the fiber bundle in order to form within the bundle at least one rigid intermediate section, wherein the adjacent bonding of the intermediate regions is achieved by at least one of (i) heating the heat-sensitive bonding agent with which the ends regions were formed to a temperature at least as high as the predetermined softening temperature and (ii) pressing the stacked intermediate regions together.

6. The method of claim 5 wherein the sum of the lengths of the ends section and the at least one intermediate section is less than the length of the fiber bundle such that the fiber bundle is flexible along at least a portion of its length.

7. The method of claim 6 wherein the adjacent bonding of at least one of (i) intermediate regions and (ii) ends regions of plural fiber ribbons to form at least one of, respectively, a rigid intermediate section and a rigid ends section is performed within a channel of a die, the die channel having predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel.

8. The method of claim 7 wherein at least one of the at least one intermediate sections is formed by a die channel including a curve along the length-shaping configuration thereof such that the at least one intermediate section formed within the die assumes a curved configuration along at least a portion of the length thereof.

9. The method of claim 6 wherein (i) the continuous fiber from which at least one of the helical fiber ribbons is fabricated comprises a fiber core having a softening temperature and an outer cladding having a second, outer-cladding-softening temperature lower than the softening temperature of the softening temperature of the fiber core and (ii) the mutual bonding of at least one selected set of adjacent portions of the continuous fiber of the fiber helix to form at least one of (a) an ends region and (b) an intermediate region comprises heating the outer cladding to a temperature at least as high as the outer-cladding-softening temperature such that the softened outer cladding acts as a bonding agent that mutually fuses the adjacent portions of the fiber.

10. The method of claim 6 wherein (i) the continuous fiber from which each of at least two helical fiber ribbons is fabricated comprises a fiber core having a softening temperature and an outer cladding having a second, outer-cladding-softening temperature lower than the softening temperature of the softening temperature of the fiber core and (ii) the mutual adjacent bonding of at least one of (a) the ends regions of the at least two helical fiber ribbons to form a fiber bundle with an ends section comprises heating the outer claddings of the ends regions to a temperature at least as high as the outer-cladding-softening temperature such that the softened outer cladding acts as a bonding agent that mutually fuses the adjacent ends regions and (b) the intermediate regions of at least two fiber ribbons to form an intermediate section of a fiber bundle comprises heating the outer claddings of the intermediate regions to a temperature at least as high as the outer-cladding-softening temperature such that the softened outer cladding acts as a bonding agent that mutually fuses the adjacent intermediate regions.

11. The method of claim 10 wherein the adjacent bonding of at least one of (i) intermediate regions and (ii) ends regions of plural fiber ribbons to form at least one of, respectively, a rigid intermediate section and a rigid ends section is performed within a channel of a die, the die channel having predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel.

12. The method of claim 11 wherein at least one of the at least one intermediate sections is formed by a die channel including a curve along the length-shaping configuration thereof such that the at least one intermediate section formed within the die assumes a curved configuration along at least a portion of the length thereof.

13. The method of claim 6 wherein at least one of (i) the ends region of each fiber ribbon of at least two fiber ribbons is formed by applying to the first selected set of adjacent portions of the continuous fiber the heat-sensitive bonding agent while the fiber helix is wound about the mandrel; and (ii) at least one of the at least one intermediate regions of each fiber ribbon of at least two fiber ribbons is formed by applying to a second selected set of adjacent fiber portions, not corresponding to the ends region of that fiber ribbon, the heat-sensitive bonding agent one of (a) while the fiber helix is wound about the mandrel and (b) subsequent to the removal of the fiber helix from the mandrel.

14. The method of claim 13 wherein the adjacent bonding of at least one of (i) intermediate regions and (ii) ends regions of plural fiber ribbons to form at least one of, respectively, a rigid intermediate section and a rigid ends section is performed within a channel of a die, the die channel having predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel.

15. The method of claim 14 wherein at least one of the at least one intermediate sections is formed by a die channel including a curve along the length-shaping configuration thereof such that the at least one intermediate section formed within the die assumes a curved configuration along at least a portion of the length thereof.

16. The method of claim 5 wherein the adjacent bonding of at least one of (i) intermediate regions and (ii) ends regions of plural fiber ribbons to form at least one of, respectively, a rigid intermediate section and a rigid ends section is performed within a channel of a die, the die channel having predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel.

17. The method of claim 16 wherein at least one of the at least one intermediate section is formed by a die channel including a curve along the length-shaping configuration thereof such that the at least one intermediate section formed within the die assumes a curved configuration along at least a portion of the length thereof.

18. The method of claim 7 wherein at least one of (i) the ends region of each fiber ribbon of at least two fiber ribbons is formed by applying to the first selected set of adjacent portions of the continuous fiber the heat-sensitive bonding agent while the fiber helix is wound about the mandrel; and (ii) at least one of the at least one intermediate regions of each fiber ribbon of at least two fiber ribbons is formed by applying to a second selected set of adjacent fiber portions, not corresponding to the ends region of that fiber ribbon, the heat-sensitive bonding agent one of (a) while the fiber helix is wound about the mandrel and (b) subsequent to the removal of the fiber helix from the mandrel.

19. The method of claim 18 wherein the adjacent bonding of at least one of (i) intermediate regions and (ii) ends regions of plural fiber ribbons to form at least one of, respectively, a rigid intermediate section and a rigid ends section is performed within a channel of a die, the die channel having predetermined cross-sectional and length-shaping configurations such that an at least one of (i) a rigid intermediate section and (ii) a rigid ends section formed within the die channel exhibits cross-sectional and length-wise configurations corresponding to the cross-sectional and length-shaping configurations of the die channel.

20. The method of claim 19 wherein at least one of the at least one intermediate sections is formed by a die channel including a curve along the length-shaping configuration thereof such that the at least one intermediate section formed within the die assumes a curved configuration along at least a portion of the length thereof.

* * * * *